Jan. 28, 1964   E. G. PATRICK   3,119,408
REMOVABLE HEAD AND SEAT VALVE UNIT
Filed Aug. 31, 1961
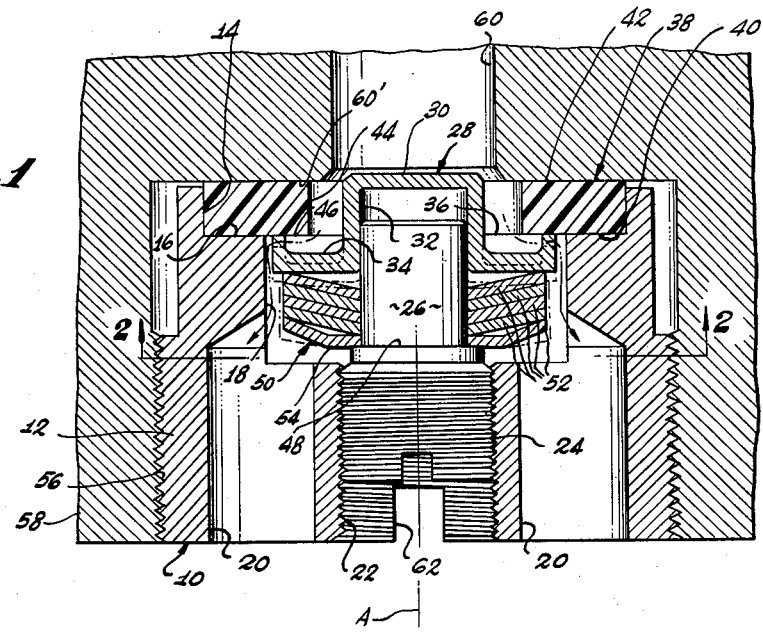
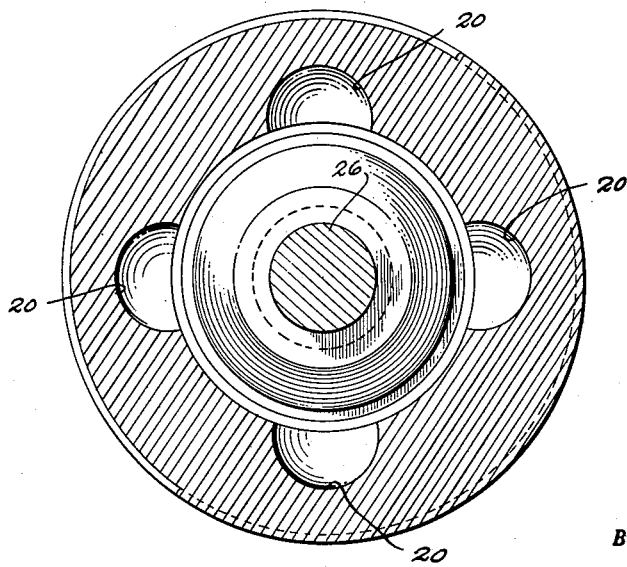
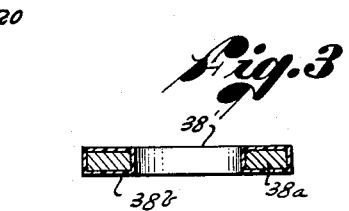
INVENTOR.
ERNEST G. PATRICK
BY Lilly & Nyhagen
ATTORNEYS 3,119,408
REMOVABLE HEAD AND SEAT VALVE UNIT
Ernest G. Patrick, La Puente, Calif., assignor to Robbins Aviation, Inc., Los Angeles, Calif., a corporation of California
Filed Aug. 31, 1961, Ser. No. 135,176
5 Claims. (Cl. 137—454.5)

This invention relates generally to fluid valves and has as its primary object to provide a fluid valve of unique construction which can be made in miniature size to serve either as an adjustable relief valve with or without a snap action or as a check valve.

Another object of the invention is to provide a fluid valve which utilizes a single sealing element both as a valve seat and as a gasket for sealing the body of the valve to a companion part.

A further object of the invention is to provide a fluid valve which is ideally adapted for high pressure and/or variable temperature operation.

Other objects, advantages, and features of the invention will become readily evident as the description proceeds.

In the ensuing description of certain presently preferred embodiments of the invention, reference is made to the attached drawing, wherein:

FIG. 1 is a longitudinal section through a relief valve constructed in accordance with the invention and mounted in a companion part for controlling the escape of fluid to atmosphere from a fluid passage in the part;

FIG. 2 is a section taken along line 2—2 on FIG. 1; and

FIG. 3 is a section through an alternative sealing element for use in the valve.

The valve 10 illustrated in FIGS. 1 and 2 of this drawing has an externally threaded, cylindrical valve body 12. In one end of body 12 is a flat bottomed, circular recess 14. Extending through the body on its central axis A and opening at one end centrally through the bottom face 16 of the recess 14 is a fluid passage 18. The other end of passage 18 terminates at an intermediate position in the body.

Extending axially into the opposite end of the body in parallel offset relation to the axis A are four fluid passages 20 which communicate at their inner ends with the inner end of the first fluid passage 18. Also extending into this opposite end of the body, on the axis A, is a threaded bore 22. A valve support 24 is threaded in the bore 22.

Valve support 24 has a smooth, cylindrical end or post 26 which extends axially through the fluid passage 18. Slidably fitted on post 26 is a valve member 28. This valve member has a generally hat-shaped section and includes a central cup portion 30 formed with an internal bore 32 which slidably receives the post 26 and with a radial flange 34 terminating in an axially extending lip 36.

Frictionally fitted within the recess 14 in the valve body 12 is a generally disc-shaped sealing element 38. This sealing element has, at one side, a first sealing face 40 confronting and adapted for sealing contact with the bottom face 16 of the recess 14 and, at its opposite side, a second exposed sealing face 42. The thickness of the sealing element 38 is slightly greater than the depth of the recess 14 so that the plane of the exposed sealing face 42 of the sealing element 38 is located outwardly of the plane of the adjacent end of the valve body 12, as shown. Extending centrally through the sealing element 38 is a fluid passage 44. This fluid passage is aligned with but somewhat smaller in diameter than the adjacent end of the passage 18 in the valve body 12. As a result, the portion of the sealing element 38 immediately about its fluid passage 44 extends over the adjacent end of the body passage 18 to form a valve seat 46. Valve member 28 is axially movable on its supporting post 26 between its solid line closed position in FIG. 1, wherein the lip 36 on the valve member engages the valve seat 46 about the fluid passage 44 in the sealing element 38, and its phantom line open position in which the valve lip 36 is spaced from the valve seat 46 to permit fluid flow between these parts, as indicated by the arrows in FIG. 1.

Fitted on the post 26, between the valve member 28 and the shoulder 48 at the base of the post, are spring means 50 for urging the valve member 28 to its closed position. Spring means 50 illustratively comprise a stack of Belleville spring washers 52 and a snap-spring washer 54. These spring washers provide the valve with a snap action, in the well-known way, as will be discussed shortly.

In use, the valve body 12 is threaded in the bore 56 of a companion part 58 having a fluid passage 60 which opens, at one end, into the bore 56 in line with the fluid passage 44 in the sealing element 38 of the valve. The valve body 10 and its companion part 58, then, together form a valve housing. The bottom face 60' of the bore 56 provides a sealing face for sealing contact with the confronting sealing face 42 of the sealing element 38. Thus, when the valve body 12 is threaded tightly in the bore 56 of part 58, the sealing element 38 is clamped tightly between the valve body and part 58 with the sealing face 40 of the sealing element in sealing contact with the sealing face 16 of the valve body and sealing face 42 of the sealing element in sealing contact with the sealing face 60' of the part 58. The valve body 12 is formed with a kerf 62 by which it may be rotated to thread it into and out of the bore 56 in part 58. From this description, it is evident that the sealing element 38 serves the dual function of a gasket for sealing the valve body 12 to the part 58 and a valve seat for contact by the valve member 28.

In operation, the valve member is normally retained in its closed position by the spring means 50 so that fluid is prevented from escaping from the passage 60 in part 58. The pressure of the spring means 50 against the valve 28 is adjusted, by rotating the valve support 24 in one direction or the other in its threaded bore 22, so that at a certain pressure of the fluid in the bore 60, the valve member 28 is forced open against the action of the spring means 50 to permit fluid to escape from the fluid passage 60, through the fluid passage 44 in the sealing element 38 and the fluid passages 18 and 20 in the valve body 12. When the snap-spring washer 54 is used, the valve member 28 will be retained in its closed position until the pressure of the fluid in passage 60 builds up to the value required to open the valve. The valve member 28 is then suddenly forced to its open position with a snap movement and will remain in this open position until the pressure of the fluid in passage 60 drops to a predetermined value, whereupon the valve member 28 will be snapped to its closed position by the spring washer 54. It will be evident, of course, that the snap action of the valve may be eliminated by substituting another spring washer for the snap-spring washer 54 or by using a simple compression spring as the spring means 50.

Sealing element 38 of the valve preferably comprises a yieldable plastic material, such as Teflon or Kel-F. It has been found, however, that these plastics expand appreciably at high temperatures and that this expansion increases the load on the valve springs and thereby upsets the accuracy of the valve. This problem can be cured in various ways. For example, the sealing element 38' can consist of a metal core 38a bearing a thin bonded layer 38b of the plastic, as illustrated in FIG. 3. In the alternative, a bimetal spring can be used in the valve which is so designed that it relieves the pressure of the valve member against the valve seat as the temperature increases so as to compensate for the swelling of the valve seat at the high temperatures.

Valve 10 can be used in various ways other than that illustrated in the drawing. For example, the valve might be mounted within a fluid line. It will be understood that in this case the fluid line will be provided with an internal sealing face for seating against the exposed sealing face 42 of the sealing element 38 of the valve. The valve 10 can also be used as a check valve which permits fluid flow past the valve seat in the direction indicated in the drawing but blocks reverse fluid flow through the valve. In this check valve application, the valve spring means 50 are either eliminated and the reversed flow of the liquid relied on to close the valve member, or replaced by a light spring which exerts just sufficient force against the valve member 38 to close the latter when the direction of the flow reverses.

Clearly, then, the invention herein described and illustrated is fully capable of attaining the several objects and advantages preliminarily set forth.

What is claimed is:

1. A valve comprising a body having a fluid passage on a given axis of and opening at one end through one side of the body, said fluid passage terminating at its other end at a central position in said body and the latter having a second fluid passage displaced from said axis and opening at one end to said other end of the first passage and at its other end through another side of said body, a removable valve seat element at said one end of said first passage having a fluid passage aligned with and smaller than said one end of said first passage, the portion of said element immediately about said passage in the element forming a valve seat, there being a threaded bore in said body on said axis opening at one end to said other end of said first passage and at its other end through the side of said body opposite said one side, a valve support threaded in said bore and formed at one end with a smooth, cylindrical post extending axially through said first passage, a valve member slidably mounted on said post for movement into and out of sealing contact with said sealing element about the fluid passage in the element, there being a shoulder at the base of said post, and spring means on said post between said shoulder and said valve member for urging the latter against said valve seat.

2. A valve comprising a body having a fluid passage on a given axis of and opening at one end through one side of the body, said fluid passage terminating at its other end at a central position in said body and the latter having a second fluid passage displaced from said axis and opening at one end to said other end of the first passage and at its other end through another side of said body, there being a recess in said one side of said body about said one end of said first passage, a valve seat element seated in said recess having a fluid passage aligned with and smaller than said one end of said first passage, the portion of said element immediately about said passage in the element forming a valve seat, there being a threaded bore in said body on said axis opening at one end to said other end of said first passage and at its other end through the side of said body opposite said one side, a valve support threaded in said bore and formed at one end with a smooth, cylindrical post extending axially through said first passage, a valve member slidably mounted on said post for movement into and out of sealing contact with said sealing element about the fluid passage in the element, there being a shoulder at the base of said post, and spring means on said post between said shoulder and said valve member for urging the latter against said valve seat.

3. A valve comprising a body having a fluid passage on a given axis of and opening at one end through one side of the body, said fluid passage terminating at its other end at a central position in said body and the latter having a second fluid passage displaced from said axis and opening at one end to said other end of the first passage and at its other end through another side of said body, a removable valve seat element at said one end of said first passage having a fluid passage aligned with and smaller than said one end of said first passage, the portion of said element immediately about said passage in the element forming a valve seat, there being a threaded bore in said body on said axis opening at one end to said other end of said first passage and at its other end through the side of said body opposite said one side, a valve support threaded in said bore and formed at one end with a smooth, cylindrical post extending axially through said first passage, a valve member slidably mounted on said post for movement into and out of sealing contact with said sealing element about the fluid passage in the element, there being a shoulder at the base of said post, and spring washers on said post between said shoulder and said valve member for urging the latter against said valve seat.

4. A valve comprising a cylindrical, externally threaded body having a coaxial recess in one end and a first fluid passage on the central axis of said body opening at one end through the bottom face of said recess, said fluid passage terminating at its other end at an intermediate position in said body, there being at least one second axial fluid passage in said body radially offset from said axis and opening at one end to said other end of said first passage and at its other end through the opposite end of said body, said body having a threaded bore on said axis opening to said other end of said first passage and through said opposite end of said body, a valve support threaded in said bore and having a smooth, cylindrical post at one end extending axially through said first passage, a flat sealing element seated in said recess having a central fluid passage aligned with and smaller than said one end of said first passage, whereby the portion of said element immediately about said fluid passage in the element extends over said one end of the first passage to form a valve seat, a valve member slidably mounted on said post for movement into and out of sealing contact with said element about the fluid passage therein, there being a shoulder at the base of said post, spring washers on said post between said shoulder and valve member for urging the latter against said valve seat, means on said valve support whereby the latter may be rotated from said opposite end of said body, and means on said opposite end of said body whereby the latter may be rotated.

5. A valve comprising a body having a fluid passage on a given axis of and opening at one end through one side of the body, said fluid passage terminating at its other end at a central position in said body and the latter having a second fluid passage displaced from said axis and opening at one end to said other end of the first passage and at its other end through another side of said body, a removable valve seat element at said one end of said first passage having a fluid passage aligned with and smaller than said one end of said first passage, the portion of said element immediately about said passage in the element forming a valve seat, there being a threaded bore in said body on said axis opening at one end to said other end of said first passage and at its other end through the side of said body opposite said one side, a valve support threaded in said bore and formed at one end with a smooth, cylindrical post extending axially through said first passage, a valve member slidably mounted on said post for movement into and out of sealing contact with said sealing element about the fluid passage in the element, there being a shoulder at the base of said post, and Belleville spring washers on said post between said shoulder and said valve member for urging the latter against said valve seat.

References Cited in the file of this patent

UNITED STATES PATENTS

| | | |
|---|---|---|
| 2,225,081 | O'Hara | Dec. 17, 1940 |
| 2,364,812 | Pierson | Dec. 12, 1944 |
| 2,664,674 | Niesemann | Jan. 5, 1954 |
| 2,706,491 | Kohler | Apr. 19, 1955 |
| 2,994,343 | Banks | Aug. 1, 1961 |